United States Patent
Ryu

(10) Patent No.: US 6,377,961 B1
(45) Date of Patent: Apr. 23, 2002

(54) METHOD FOR DISPLAYING INTERNET SEARCH RESULTS

(75) Inventor: Yeon-Seung Ryu, Seoul (KR)

(73) Assignee: SamSung Electronics, Co., Ltd., Suwon (KR)

(*) Notice: Subject to any disclaimer, the term of this patent is extended or adjusted under 35 U.S.C. 154(b) by 0 days.

(21) Appl. No.: 09/234,370

(22) Filed: Jan. 21, 1999

(30) Foreign Application Priority Data

Jan. 23, 1998 (KR) .............................................. 98-2019

(51) Int. Cl.[7] .................................................. G06F 7/00
(52) U.S. Cl. ............................. 707/217; 707/3; 709/217
(58) Field of Search ................................. 701/200, 300; 709/217; 707/3.7

(56) References Cited

U.S. PATENT DOCUMENTS

| | | |
|---|---|---|
| 5,787,254 A | 7/1998 | Maddalozzo, Jr. et al. |
| 5,890,152 A | 3/1999 | Rapaport et al. ............... 707/8 |
| 5,930,474 A * | 7/1999 | Dunworth et al. ..... 395/200.47 |
| 6,014,090 A * | 1/2000 | Rosen et al. ................. 340/905 |
| 6,041,326 A * | 3/2000 | Amro et al. .................... 707/10 |
| 6,052,439 A * | 4/2000 | Gerszberg et al. ........ 379/88.01 |
| 6,067,552 A | 5/2000 | Yu ............................. 707/501 |
| 6,085,186 A * | 7/2000 | Christianson et al. .......... 707/3 |
| 6,144,962 A | 11/2000 | Weinberg et al. ............. 707/10 |

OTHER PUBLICATIONS

Printout (3 pages) of Alta Vista™ "HELP" dated Jan. 6, 1999.
Copy of U.S. Application Ser. No. 09/236,109, filed on Jan. 25, 1999.
Copy of Amendment And Response, filed on Apr. 12, 2001 in U.S. Application Ser. No. 09/236,109.
Copies of three Yhoo! Yellow Page Results printed on Jan. 7, 1999.

* cited by examiner

Primary Examiner—John A. Follansbee
(74) Attorney, Agent, or Firm—Robert F. Bushnell, Esq.

(57) ABSTRACT

A method starts with submitting an internet protocol address to a web search engine so that the location of a user can be determined. Then, a user inputs one or more keywords that can be used by the web search engine to compare with all of its generated indexes. After searching various indexes, the web search engine may find multiple uniform resource locators that identify various servers that contain information that may be relevant to the user's search. Then, the web search engine uses an internet protocol mapping table, that is generated by the web search engine along with other data regarding various uniform resource locators prior to performing the requested search, to correlate the uniform resource locators with the geographical address of the server. Afterwards, the web search engine is able to sort the results of the search using the distance between the uniform resource locators and the user. Once the user has this information it is much simpler to determine which uniform resource locator may correlate with an easy to travel to business. This feature will enhance existing web search engines and thus, further increase the expanding popularity of using the internet to gather useful information.

16 Claims, 3 Drawing Sheets

| IP-ADDRESS & LOCATION MAPPING TABLE ||
|---|---|
| IP-ADDRESS | LOCATION |
| ... | ... |

FIG. 1 *(Prior Art)*
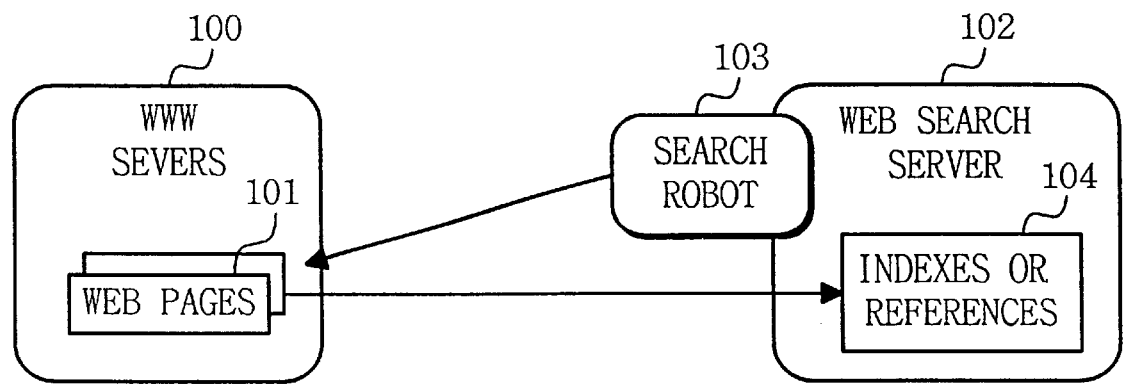
FIG. 2 *(Prior Art)*
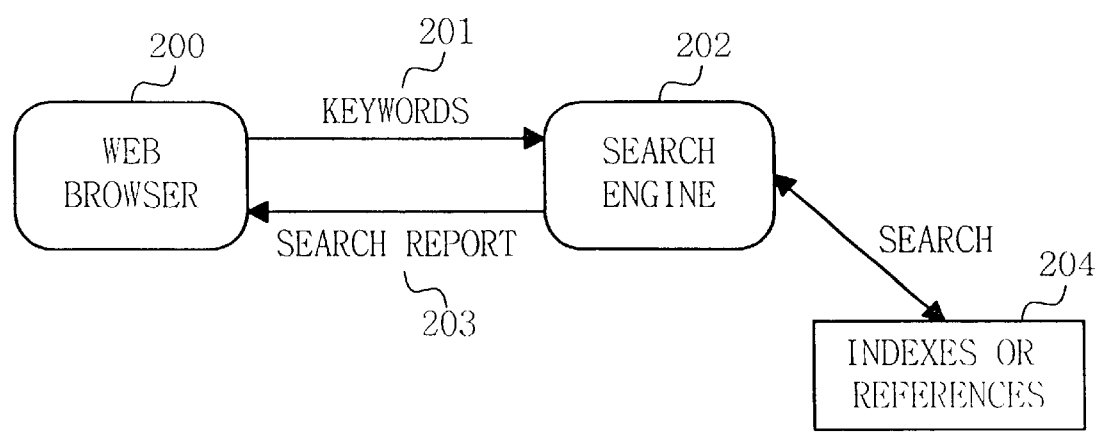

FIG. 3 *(Prior Art)*

1. Java Beans - Related APIs
    Java. TM. Beans - Related APIs. The Java Beans APIs are also closely related to other new java core APIs which are described in separate documents. "The....
    http://splash.javasoft.com/beans/related.html - size 2K - 14-Apr-97 - English

FIG. 4 *(Prior Art)*

1) Java Checker for personal use.
    Java Applet Checker. This clock works on JAVA-Alpha clients. (e.g., hotjava) THis clock works on JAVA-Beta clientsa. (e.g., netscape) I can't understa.
    http://133.24.124.83/~y0026/java!/index.html [100%]

THE URL OF THE CORRESPONDING WEB PAGE

APPROXIMATION OF THE KEYWORD REQUESTED BY THE USER (IN THIS CASE, THE KEYWORD IS "JAVA")

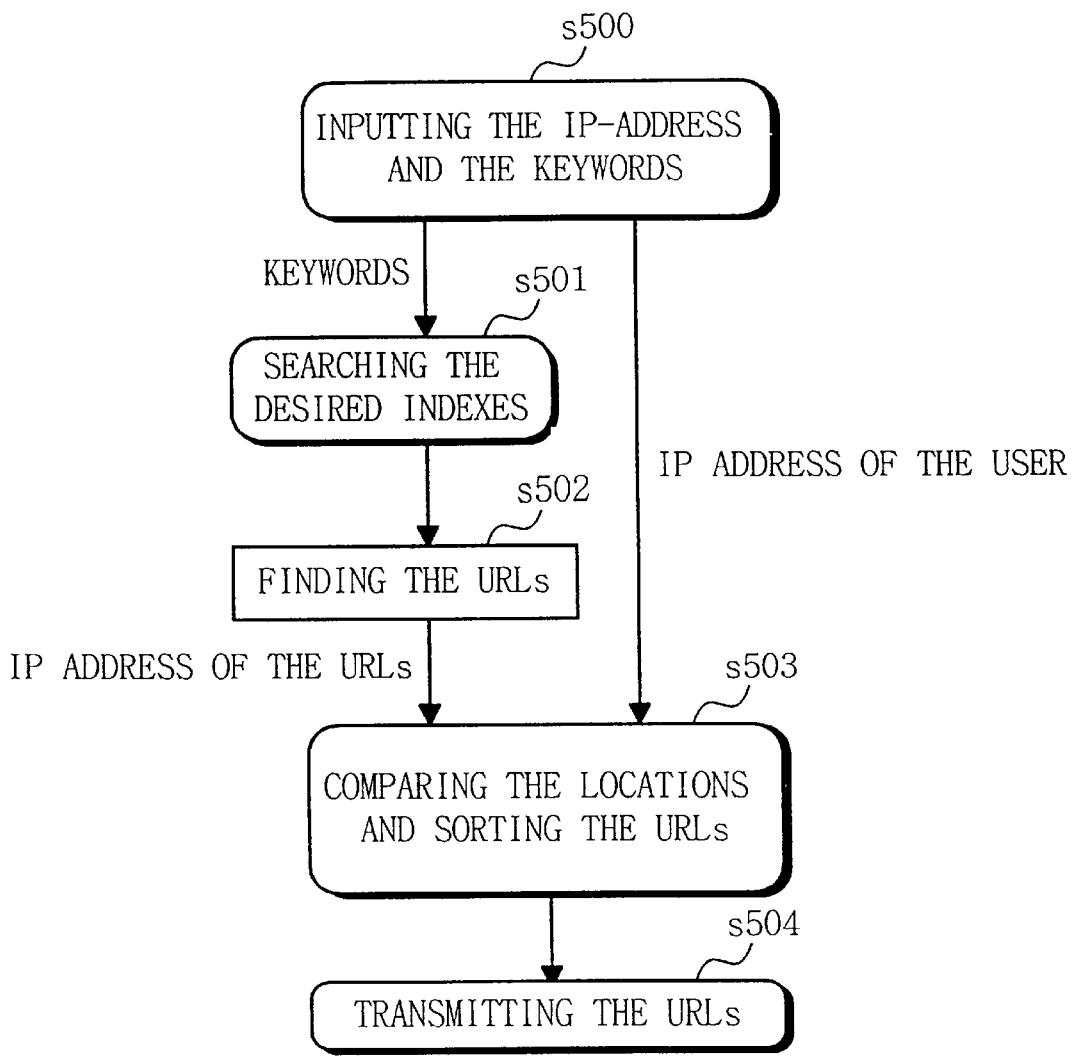

METHOD FOR DISPLAYING INTERNET SEARCH RESULTS

CLAIM OF PRIORITY

This application makes reference to, incorporates the same herein, and claims all rights accruing thereto under 35 U.S.C. §119 through my patent application entitled Method for Displaying the Information Searched on the Web in Distance Order earlier filed in the Korean Industrial Property Office on the Jan. 23, 1998 and there duly assigned Serial No. 1998/2019.

BACKGROUND OF THE INVENTION

1. Field of the Invention

The present invention relates to a method for displaying information that is found by a search engine using the internet and, more specifically, to a search engine that is capable of displaying search results in a sorted manner starting with the uniform resource locator that is closest, in geographical distance, through the uniform resource locator that is the farthest of those found during the search.

2. Background Art

The development of computerized information resources such as the "Internet" and the proliferation of the "web" browsers allow users of data-processing systems to link with other servers and networks. The relative ease with which people can access information on other servers has lead to a geometric increase in the number of people who use the internet to access information. To some extent, the internet is even displacing more conventional means of distributing information, such as newspapers, magazines, and even television. With this much information available at the fingertips of a user, the only difficulty becomes finding the right server to access to retrieve information that a user would find relevant.

Fortunately, an ever growing group of search engines are becoming available that facilitate the finding of internet protocol addresses that identify the servers that contain information sought by a user. These search engines catalog information from many different servers and store keywords in various indexes that are used by the search engine. Thus, when a user wishes to find information, but does not know which server to access, a user can enter keywords into a search engine and then obtain a list of servers that may potentially contain the information for which the user is searching.

Web search servers have their own search robots that periodically circulate among various interconnected web servers, and visit various web pages, that are maintained and geographically located all over the world. The web search servers analyze the contents of web pages and build indexes, or references, that store relevant information about the web pages located on the various servers. The indexes include a summary and the uniform resource locators for the web pages on the server. When using web search engines, the user contacts the web search engine over the internet through a web browser. When the user inputs keywords that represent the type of information desired, the web search engine searches the previously generated indexes, that were created with the use of search robots. Then, the uniform resource locators of the servers that contain information related to the information desired by a user are transmitted to the user.

However, the contemporary art does not take the regional location of the servers into account while displaying the uniform resource locators that have been found during a search. This makes it very difficult for a user that wants to travel to a place or business that is associated with one of the search results to determine which business is the closest to the user's location. Instead of sorting the search results by geographical location, one of many conventional methods is used. One method is to display the search results in random order. Alternatively, the contents of the results can be contrasted heuristically and statistically to determine to what degree the search results match the web searcher's key words. Therefore, when a user wishes to determine the closest location of one of the search results, a time consuming process of individually accessing each server to find relevant geographical information must take place.

As such, I believe that it may be possible to provide a method for displaying search results from an internet search that provides the individual search results in a sorted manner using the distance from the servers that possibly contain information sought by the user to the location of the user, and that reduces the time necessary to determine the closest search result to a user.

SUMMARY OF THE INVENTION

Accordingly, it is an object of the present invention to provide a method for displaying internet search results that sorts the found uniform resource locators using geographic distance from a user that is performing the search.

It is another object to provide a method for displaying internet search results that sorts search results starting with the first result that is closest to a user up through a search result that is the farthest geographically from a user.

It is yet another object to provide a method for displaying internet search results that reduces the amount of time a user must devote to determining the uniform resource locator that is geographically the closest to the user.

It is still another object of the present invention to provide a method for combining the uniform resource locators and the internet protocol addresses with the geographic location information of the servers containing information found during an internet search.

To achieve these and other objects a method for displaying information found during an internet search is provided. The method starts with submitting an internet protocol address to a web search engine so that the location of a user can be determined. Then, a user inputs one or more keywords that can be used by the web search engine to compare with all of its generated indexes.

After searching various indexes, the web search engine may find multiple uniform resource locators that identify various servers that contain information that may be relevant to the user's search. Then, the web search engine uses an internet protocol mapping table to correlate the uniform resource locators with the geographical address of the server. Afterwards, the web search engine is able to sort the results of the search using the distance between the uniform resource locators and the user. Once the user has this information it is much simpler to determine which uniform resource locator may correlate with an easy to travel to business. This feature will enhance existing web search engines and thus, further increase the expanding popularity of using the internet to gather useful information.

The sorting of the various search results uses the steps of: referring to the internet protocol location mapping table, also referred to as the internet protocol mapping table, and sorting the information in order from the search result nearest to the user to the search result farthest from a user.

The internet protocol location mapping table correlates the internet protocol addresses and the locations of the internet protocol addresses. During the sorting step, separate distances are found for each server found by the search with each geographical distance being measured from the user's internet protocol location to the internet protocol location of one of the servers found in the search.

The internet protocol location mapping table that is used by the web search engine, is generated prior to the search initiated by a user.

BRIEF DESCRIPTION OF THE PREFERRED EMBODIMENTS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 illustrates a diagram for searching the information by the web search servers;

FIG. 2 illustrates a diagram for searching the information by utilizing the web search engine;

FIG. 3 illustrates a display of search results generated by using the keyword "Java" on the Altavista© web search engine;

FIG. 4 illustrates a display of search results generated by using the keyword "Java" on the Lycos© web search engine;

FIG. 5 illustrates a flow chart for the components and control of the web search engine according to the present invention; and FIG. 6 illustrates an internet protocol address and location mapping table.

DETAILED DESCRIPTION OF THE PREFERRED EMBODIMENTS

Turning now to the drawings, FIG. 1 is a diagram illustrating the searching of information by a web search engine. Web search servers 102 have their own search robots 103 that periodically circulate among various interconnected web servers 100 and visit various web pages 101 that are geographically located all over the world. The web search servers analyze the contents of web pages and build indexes, or references, 104 that store relevant information about the web pages located on the various servers. The indexes include a summary and the uniform resource locators for the web pages on the server.

FIG. 2 illustrates a diagram for searching the internet using a web search engine. When using web search engines, or web search servers, the user, or web searcher, contacts the web search server sites through web browser 200. When the user, or web searcher, inputs keywords 201, representing the type of information desired by the user, web search engine 202 searches the previously generated indexes, or references, 204 and transmits uniform resource locators 203 of the servers that contain information related to the information desired by a user.

FIG. 3 illustrates a display of search results generated by searching with the keyword "Java" on the Altavista© web search engine. FIG. 4 illustrates a display of the search results that are generated using the keyword "Java" on the Lycos© web search engine. One method of displaying the uniform resource locators, that represent the servers containing the appropriate information, shows a random displaying method, as shown in FIG. 3. FIG. 4 shows a content method of displaying uniform resource locators. Using a content method, the search results are correlated in a statistical fashion and the various uniform resource locators are displayed in an order that starts with those uniform resource locators that identify pages containing information that is closest to that requested, using keywords, by the user.

Referring to FIG. 5, when the user, or web searcher, contacts a web search engine, the uniform resource locator of the user becomes known to web search engine through the hypertext transfer protocol. After selecting keywords that are related to the information sought by the user, the user inputs the keywords via a browser to the web search engine. Then, during step s500, the web search engine receives the user's uniform resource locator and the selected keywords via the hypertext transfer protocol, that is used as the protocol between the server and the browser.

In step s501, the web search engine finds servers that may potentially contain relevant information using previously developed indexes, as well as the keywords received from the user. After the searching is completed, the uniform resource locators of the searched information are found during step s502. In step s503, the uniform resource locators are correlated with the geographical location of the servers using a location mapping table. Once the locations of the various search results are determined, it is possible to sort the search results using each results relative distance from the user. After the results are sorted, the search is transmitted to the user during step s504.

Referring to FIG. 6, the web search engine uses a previously developed internet protocol location mapping table that stores respective internet protocol addresses and their corresponding geographical location information. For example, if the internet protocol address is (147.46.x.x), the location information is (far east, Korea, ?), and, if the internet protocol address is (204.133.x.x), the location information is (north America, U.S.A., ?). More specifically, the location mapping table can be further used to sort server locations, starting from those server locations that are closest to the user to those server locations that are the farthest from the user's location.

Restated, to sort the search results, the internet protocol address of the user and the internet protocol addresses of the uniform resource locators corresponding to the search results are then compared. The searched information is then easily sorted in order starting with those uniform resource locators that are close to the user. The sorted information is then transmitted to the user.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method for sorting internet search results, comprising the steps of:

submitting an internet protocol address of a user to a web search engine;

inputting at least one keyword that said web search engine uses to perform a search;

searching a plurality of indexes utilizing said at least one keyword by said web search engine to find as a result any uniform resource locator that correlates to said at least one keyword;

comparing said internet protocol address of said user with each internet protocol address that respectively corresponds to a uniform resource locator found in said searching step that correlates to said at least one keyword;

sorting in an order of relative distance from the user each said internet protocol address determined in said comparing step that respectively corresponds to a uniform resource locator found in said searching step that correlates to said at least one keyword to generate a sorted result; and transmitting said sorted result to said user.

2. The method of claim 1, further comprised of said sorting step comprising the additional steps of:

referring to an internet protocol mapping table for each said internet protocol address; and sorting from said internet protocol mapping table in an order of geographic distance between each said uniform resource locator, found in said searching step that correlates to said at least one keyword and that corresponds to an internet protocol address in said internet protocol mapping table, and said user, said sorted result providing an order of each said uniform resource locator starting with a uniform resource locator corresponding to a nearest internet protocol address to said user to a uniform resource locator corresponding to a farthest internet protocol address from said user.

3. The method of claim 2, further comprised of said internet protocol mapping table correlating each said internet protocol address with a corresponding geographical location.

4. The method of claim 2, further comprised of said sorting step further comprised of determining and comparing a distance between said user and each said uniform resource locator found in said searching step that correlates to said at least one keyword.

5. The method of claim 4, further comprised of said internet protocol mapping table being generated prior to a search performed by said web search engine.

6. The method of claim 2, further comprised of a step of determining a geographical location of said user from said internet protocol address of said user in said sorting step.

7. A method for displaying internet search results, comprising the steps of:

submitting an internet protocol address of a user to a web search engine;

inputting at least one keyword that said web search engine uses to perform a search;

searching a plurality of indexes utilizing said at least one keyword by said web search engine to find as a result any uniform resource locator that correlates to said at least one keyword;

comparing said internet protocol address of said user with each internet protocol address that respectively corresponds to a uniform resource locator found in said searching step that correlates to said at least one keyword;

sorting to generate a sorted result by ordering each said uniform resource locator found in said searching step that correlates to said at least one keyword in an order of distance between said internet protocol address of said user and each said internet protocol address determined in said comparing step that respectively corresponds to a uniform resource locator found in said searching step that correlates to said at least one keyword; and transmitting said sorted result for display to said user.

8. The method of claim 7, further comprised of said sorting step comprising the additional steps of:

referring to an internet protocol mapping table for each said internet protocol address; and sorting from said internet protocol mapping table in an order of geographic distance between each said uniform resource locator, found in said searching step that correlates to said at least one keyword and that corresponds to an internet protocol address in said internet protocol mapping table, and said user, said sorted result providing for display each said uniform resource locator found in said searching step that correlates to said at least one keyword starting with a uniform resource locator corresponding to a nearest internet protocol address to said user to a uniform resource locator corresponding to a farthest internet protocol address from said user.

9. The method of claim 8, further comprised of said internet protocol mapping table correlating each said internet protocol address with a corresponding geographical location.

10. The method of claim 9, further comprised of said sorting step further comprised of determining and comparing a distance between said user and each said uniform resource locator found in said searching step that correlates to said at least one keyword.

11. The method of claim 10, further comprised of said internet protocol mapping table being generated prior to a search performed by said web search engine.

12. The method of claim 11, further comprised of a step of determining a geographical location of said user from said internet protocol address of said user in said sorting step.

13. A method for sorting internet search results, comprising the steps of:

submitting an internet protocol address of a user to a web search engine;

inputting at least one keyword that said web search engine uses to perform a search;

searching a plurality of indexes utilizing said at least one keyword by said web search engine to find as a result any uniform resource locator that correlates to said at least one keyword;

checking an internet protocol mapping table to correlate each said uniform resource locator, found in said searching step that correlates to said at least one keyword, to a corresponding internet protocol address, said internet protocol mapping table correlating each said internet protocol address with a corresponding geographical location, said internet protocol mapping table being generated simultaneously while generating said plurality of indexes;

comparing said internet protocol address of said user with each said internet protocol address in said internet protocol mapping table that respectively corresponds to a uniform resource locator found in said searching step that correlates to said at least one keyword;

sorting to generate a sorted result by ordering each said uniform resource locator found in said searching step that correlates to said at least one keyword in an order of distance between said internet protocol address of said user and each said internet protocol address in said internet protocol mapping table that respectively corresponds to a uniform resource locator found in said searching step that correlates to said at least one keyword; and transmitting said sorted result to said user.

14. The method of claim 13, further comprised of said sorting step comprising the additional step of sorting from said internet protocol mapping table in an order of geographic distance between each said uniform resource locator, found in said searching step that correlates to said at least one keyword and that corresponds to an internet protocol address in said internet protocol mapping table, and said user, said sorted result providing an order of each said uniform resource locator starting with a uniform resource locator corresponding to a nearest internet protocol address to said user to a uniform resource locator corresponding to a farthest internet protocol address from said user.

15. The method of claim 14, further comprised of said sorting step further comprised of determining and comparing a distance between said user and each said uniform resource locator found in said searching step that correlates to said at least one keyword.

16. The method of claim 15, further comprised of a step of determining a geographical location of said user from said internet protocol address of said user in said sorting step.

* * * * *